(12) United States Patent
Ohlson

(10) Patent No.: US 8,818,061 B2
(45) Date of Patent: Aug. 26, 2014

(54) METHOD FOR CHARACTERIZING A BLOOD VESSEL

(75) Inventor: Fredrik Ohlson, Torslanda (SE)

(73) Assignee: Orzone AB, Göteborg (SE)

( * ) Notice: Subject to any disclaimer, the term of this patent is extended or adjusted under 35 U.S.C. 154(b) by 365 days.

(21) Appl. No.: 13/497,259

(22) PCT Filed: Sep. 10, 2010

(86) PCT No.: PCT/EP2010/063280
§ 371 (c)(1),
(2), (4) Date: Apr. 24, 2012

(87) PCT Pub. No.: WO2011/032889
PCT Pub. Date: Mar. 24, 2011

(65) Prior Publication Data
US 2012/0207364 A1 Aug. 16, 2012

(30) Foreign Application Priority Data
Sep. 21, 2009 (EP) .................................. 090170870

(51) Int. Cl.
*G06K 9/00* (2006.01)
*G06T 7/00* (2006.01)

(52) U.S. Cl.
CPC ..... *G06T 7/0083* (2013.01); *G06T 2207/30101* (2013.01); *G06T 2207/10072* (2013.01)
USPC ........... 382/128; 382/131; 382/132; 600/407; 600/454; 600/465; 600/468; 600/504

(58) Field of Classification Search
None
See application file for complete search history.

(56) References Cited

U.S. PATENT DOCUMENTS

| 4,985,834 | A | * | 1/1991 | Cline et al. ..................... 345/424 |
| 5,166,876 | A | * | 11/1992 | Cline et al. ..................... 345/424 |
| 6,134,353 | A |   | 10/2000 | Makram-Ebeid |

(Continued)

FOREIGN PATENT DOCUMENTS

EP WO2008150945 12/2008

OTHER PUBLICATIONS

Baker et al, "Cochlea Modelling: Clinical Challenges and Tubular Extraction", 17th Australian Joint Conference on Artificial Intelligence, 2004, pp. 74-85, XP002555754 abstract sections 3.1-3.2.

(Continued)

*Primary Examiner* — Chan Park
*Assistant Examiner* — Iman K Kholdebarin
(74) *Attorney, Agent, or Firm* — Babcock IP, PLLC

(57) ABSTRACT

The present invention relates to a method for characterizing a blood vessel represented by vascular image data, wherein said vascular image data comprises a plurality of voxels each having an image intensity, said method comprising the steps of identifying a set of voxels representing a boundary of the blood vessel; determining a gradient vector of the image intensity for each voxel in said set of voxels representing the boundary of the blood vessel; selecting, from said set of voxels representing the boundary of the blood vessel, a subset of voxels such that all voxels have a common intersection point for their respective gradient vector extensions; and determining a vector product based on said gradient vectors for said subset of voxels, wherein the common intersection point indicates a center of said blood vessel and said vector product indicates a direction in which said blood vessel extends.

8 Claims, 3 Drawing Sheets

(56) References Cited

U.S. PATENT DOCUMENTS

| | | | |
|---|---|---|---|
| 6,643,533 B2* | 11/2003 | Knoplioch et al. | 600/407 |
| 6,690,816 B2* | 2/2004 | Aylward et al. | 382/128 |
| 6,842,638 B1 | 1/2005 | Suri et al. | |
| 6,970,594 B2* | 11/2005 | Williams | 382/154 |
| 7,103,202 B2* | 9/2006 | Bruijns | 382/128 |
| 7,529,395 B2* | 5/2009 | Cathier et al. | 382/128 |
| 7,672,493 B2* | 3/2010 | Qing et al. | 382/128 |
| 8,192,361 B2* | 6/2012 | Sendai | 600/437 |
| 8,620,055 B2* | 12/2013 | Barratt et al. | 382/131 |
| 2002/0196965 A1* | 12/2002 | Wallace et al. | 382/131 |
| 2003/0053669 A1 | 3/2003 | Suri et al. | |
| 2003/0053697 A1* | 3/2003 | Aylward et al. | 382/203 |
| 2006/0120591 A1 | 6/2006 | Cathier et al. | |
| 2006/0173272 A1* | 8/2006 | Qing et al. | 600/407 |
| 2006/0184021 A1* | 8/2006 | Kim et al. | 600/437 |
| 2007/0121787 A1 | 5/2007 | Kiraly et al. | |
| 2007/0165924 A1* | 7/2007 | Nicponski | 382/128 |
| 2008/0133040 A1* | 6/2008 | Boyden et al. | 700/98 |
| 2008/0304616 A1* | 12/2008 | Van Uitert et al. | 378/4 |
| 2010/0130878 A1* | 5/2010 | Lasso et al. | 600/500 |
| 2010/0284588 A1* | 11/2010 | Valadez | 382/128 |
| 2011/0026793 A1* | 2/2011 | Goel et al. | 382/131 |
| 2012/0083696 A1* | 4/2012 | Kitamura | 600/443 |

OTHER PUBLICATIONS

Baker et al, "Principal Flow for Tubular Objects with Non-Circular Cross-sections", Pattern Recognition, 2004. ICPR 2004, Proceedings of the 17th International Conference on Pattern Recognition, Cambridge, UK Aug. 23-26, 2004, Piscataway, NJ USA, IEEE vol. 3, Aug. 23, 2004, pp. 750-753, XP010724769 ISBN: 978-0-695-2128-2.

Hammond et al, "The role of standards in creating a health information infrastructure, International Journal of Bio-Medical Computing", Elsevier Science Publishers, Shannon, IE. vol. 34, No. 1-4, Jan. 1, 1994, pp. 29-44, XP026247956, ISSN 0020-7101, p. 35.

Wink et al, "Fast Delineation and Visualization of Vessels in 3-D Angiographic Images", IEE Transactions on Medical Imaging, Apr. 1, 2000, Piscataway, NJ USA, IEEE vol. 19. No. 4, XP011035963, ISSN: 0278-0062.

Tsai et al, "Model-Based Method for Improving the Accuracy and Repeatability of Estimating Vascular Bifurcations and Crossovers from Retinal Fundus Images", IEE Transactions on Information Technology in Biomedicine, IEEE Service Center, Los Alamitos, CA vol. 8 No. 2. Jun. 1, 2004, pp. 122-130, XP011113501, ISSN: 1089-7771.

* cited by examiner

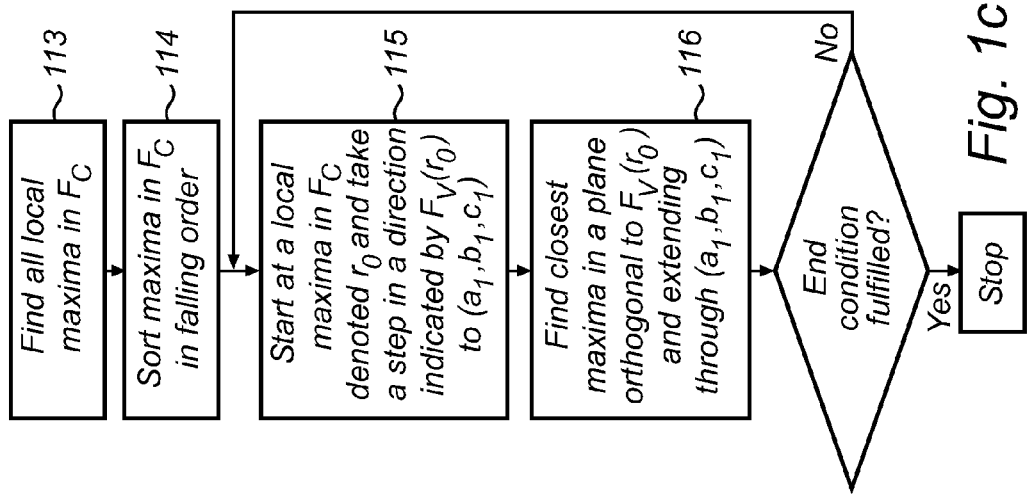
Fig. 1c
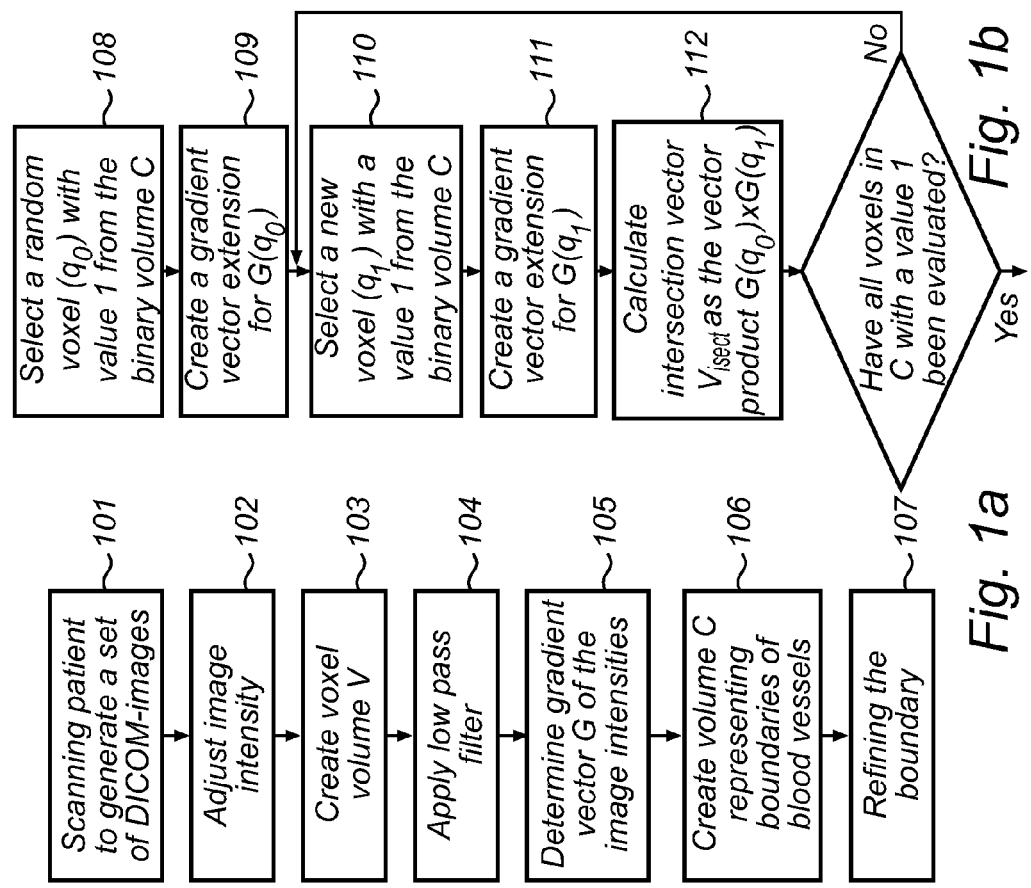
Fig. 1b
Fig. 1a

METHOD FOR CHARACTERIZING A BLOOD VESSEL

TECHNICAL FIELD

The present invention relates to a method for characterizing a blood vessel represented by vascular image data.

BACKGROUND OF THE INVENTION

Angiography is a medical imaging technique to image blood vessels and blood vessel systems, and can be used for example to enable diagnostics, surgical planning, and simulation.

Angiographic image data can be generated by injecting a contrast agent intravenously to a patient and scanning the patient using e.g. Computed Tomography (CT) or Magnetic Resonance Imaging (MRI). The resulting angiographic image data is typically a set of DICOM-images forming a voxel volume with discrete image intensities. The voxel volume can be processed to segment organs, blood vessels, skeleton etc. In particular, the segmentation and further characterization can provide a segmented surface that delimits the blood vessel or vessel system from other tissues.

An example of such a characterization method for characterizing a vascular system in a three-dimensional angiographic image comprised of voxels is disclosed in U.S. Pat. No. 6,842,638. Here a two-dimensional slice formed of pixels is extracted from the angiographic image. Imaged vascular structures in the slice are located and flood-filled. The edges of the filled regions are iteratively eroded to identify vessel centres. The extracting, locating, flood-filling, and eroding is repeated for a plurality of slices to generate a plurality of vessel centres that are representative of the vascular system. A vessel centre is selected, and a corresponding vessel direction and orthogonal plane are found. The vessel boundaries in the orthogonal plane are identified by iteratively propagating a closed geometric contour arranged about the vessel centre. The selecting, finding, and estimating are repeated for the plurality of vessel centres, and the estimated vessel boundaries are then interpolated to form a vascular tree.

However, sometimes a portion of the boundary of a blood vessel may be "missing", or not discernable, such that the boundary does not continuously enclose the blood vessel in the dimensional slice. If so, the flood-filling procedure will fail as it expands outside the blood vessel. This makes the method suggested in U.S. Pat. No. 6,842,638 sensitive to imperfections in the DICOM-image. Thus, there is a need for a more robust method to characterize a blood vessel.

SUMMARY OF THE INVENTION

In view of the above, an object of the invention is to at least alleviate the problem discussed above. According to an aspect of the invention, there is provided a method for characterizing a blood vessel represented by vascular image data from a DICOM-image, wherein the vascular image data comprises a plurality of voxels each having an image intensity. The method comprises the steps of identifying a set of voxels representing at least a portion of a boundary of the blood vessel, determining a gradient vector of the image intensity for each voxel in the set of voxels representing the boundary of the blood vessel, selecting, from the set of voxels representing the boundary of the blood vessel, a subset of voxels such that all voxels in the subset of voxels have a common intersection point for their respective gradient vector extensions, and determining a vector product based on the gradient vectors for the subset of voxels, wherein the common intersection point indicates a centre of the blood vessel and the vector product indicates a direction in which the blood vessel extends.

The present invention is based on the understanding that since a blood vessel typically has a tubular shape, the gradient vectors of the image intensities at the boundary of the blood vessel will be directed radially outwards and thus the point where extensions of these gradient vectors meet may serve as an indication of the centre of the blood vessel. Furthermore, the vector product between two gradient vectors located at the boundary can be used to indicate the direction in which the blood vessel extends. The inventive method is advantageous in that even though a portion of the boundary is missing, or not discernable, the centre of the blood vessel may still be found from the available portion of the boundary.

A boundary is here intended to indicate a segment of the blood vessel that delimits the blood vessel from other tissue. It shall be noted that the boundary may be continuous or discontinuous (i.e. a portion of the boundary may be missing). The common intersection point may typically be a small discrete volume. For example, the subset may include all voxels having gradient vector extensions that pass through a common voxel. Further, each gradient vector extension starts from the voxel in which the gradient vector is calculated.

A set of voxels representing a boundary of the blood vessel can be found by computing a gradient vector of the image intensity for each of the plurality of voxels, and selecting a set of voxels having a gradient vector norm that exceeds a predetermined threshold value. Note that, in this case, the gradient vectors for the voxels are determined before the set of voxels representing the boundary of the blood vessel is identified, instead of after.

According to an embodiment, any voxel that has an adjacent voxel, in a direction of the gradient vector, with a larger gradient vector norm may be excluded from the set of voxels representing the boundary of a blood vessel. An advantage is that this may result in a thinner, more well-defined boundary region. This can also be achieved by only including voxels where a second derivative of the image intensity is essentially zero.

Preferably, the gradient vector extension may be adapted to extend in a direction opposite to the direction of the gradient vector. Furthermore, a length of the gradient vector extension may be determined by a predetermined end condition. An example of an end condition would be that the gradient vector extension only extends until the opposite boundary of the blood vessel is reached, or that the gradient vector extension extends a predetermined length. The predetermined length may preferably be set sufficiently low to prevent that the gradient vector extension intersects gradient vector extensions associated with other blood vessels. An advantage with putting restrictions on the length of the gradient vector extension is that the risk of unintentionally including gradient vector extensions from adjacent blood vessels in the subset of voxels having a common intersection point for their respective gradient vector extensions is reduced.

The method may further comprise the step of iteratively selecting an additional subset of voxels from the set of voxels representing the boundary of the blood vessel, wherein all voxels in the additional subset of voxels have a common intersection point for their respective gradient vector extensions and the common intersection point indicates a possible centre point of the blood vessel.

Furthermore, the method according to the present invention may advantageously be included in a method for determining a blood vessel path by: finding a plurality of possible centre points of the blood vessel, selecting a voxel that corresponds to one of the centre points as a starting point for the blood vessel, tracing the blood vessel path by iteratively: identifying a possible centre point that is located in a plane that is orthogonal to the direction of the blood vessel, wherein the plane extends through a voxel that is located within a predetermined range from (e.g. next to) the current centre point in a direction of the blood vessel, including the identified possible centre point in the blood vessel path. The predetermined range may preferably be one voxel thereby making full use of the resolution in the DICOM-image.

Additionally, when there is more than one possible centre point located in the plane, the centre point to be included in the vessel path may be selected by iteratively comparing the gradient vector norm of the current voxel with the gradient vector norm of all neighbouring voxels located in the plane and changing to the neighbouring voxel located in the plane that has the largest gradient vector norm until a voxel is found having a gradient vector norm larger than all neighbouring voxels in the plane.

Tracing of the blood vessel path may preferably stop when an end condition is fulfilled. The end condition may, for example, be at least one of that the boundary of the voxel volume is reached, that a blood vessel path that has already been traced is reached, that the intensity of the centre point is below a predetermined threshold value and that the vector product associated with the centre point is a zero vector. The method may also comprise the step of removing vessel paths that are not attached to the rest of the vessel structure. This removes objects that are not blood vessels.

Also, the method according to the present invention may advantageously be included in a method for creating a blood vessel system by: determining a plurality of blood vessel paths as described above, removing blood vessel paths that are not attached to the rest of the blood vessel system. Additionally, after a blood vessel path has been determined, a blood vessel surface may be created by sampling in a plane normal to a direction of the path.

According to another aspect of the present invention there is provided a device for characterizing a blood vessel represented by vascular image data from a DICOM-image, wherein said vascular image data comprises a plurality of voxels each having an image intensity, said device comprising means for identifying a set of voxels representing at least a portion of a boundary of the blood vessel, determining a gradient vector of the image intensity for each voxel in said set of voxels representing the boundary of the blood vessel, selecting, from said set of voxels representing the boundary of the blood vessel, a subset of voxels such that all voxels in said subset of voxels have a common intersection point for their respective gradient vector extensions, and determining a vector product based on said gradient vectors for said subset of voxels, wherein the common intersection point indicates a centre of said blood vessel and said vector product indicates a direction in which said blood vessel extends. This aspect of the invention provides similar advantages as discussed above in relation to the previous aspect of the invention. Additionally, the inventive device may be comprised in a blood vessel characterizing system, further comprising means for acquiring a DICOM-image.

According to a still further aspect of the present invention there is provided a computer program product comprising a computer readable medium having stored thereon computer program means for causing a computer to provide a method for characterizing a blood vessel represented by vascular image data from a DICOM-image, wherein said vascular image data comprises a plurality of voxels each having an image intensity, visual categorization method, wherein the computer program product comprises code for identifying a set of voxels representing at least a portion of a boundary of the blood vessel, code for determining a gradient vector of the image intensity for each voxel in said set of voxels representing the boundary of the blood vessel, code for selecting, from said set of voxels representing the boundary of the blood vessel, a subset of voxels such that all voxels in said subset of voxels have a common intersection point for their respective gradient vector extensions, and code for determining a vector product based on said gradient vectors for said subset of voxels, wherein the common intersection point indicates a centre of said blood vessel and said vector product indicates a direction in which said blood vessel extends. This aspect of the invention provides similar advantages as discussed above in relation to the previous aspects of the invention. Also, the computer readable medium may be one of a removable non-volatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1a-1c shows schematic flow charts of a currently preferred method for characterizing a blood vessel;

DETAILED DESCRIPTION OF PREFERRED EMBODIMENTS

Figure 2:
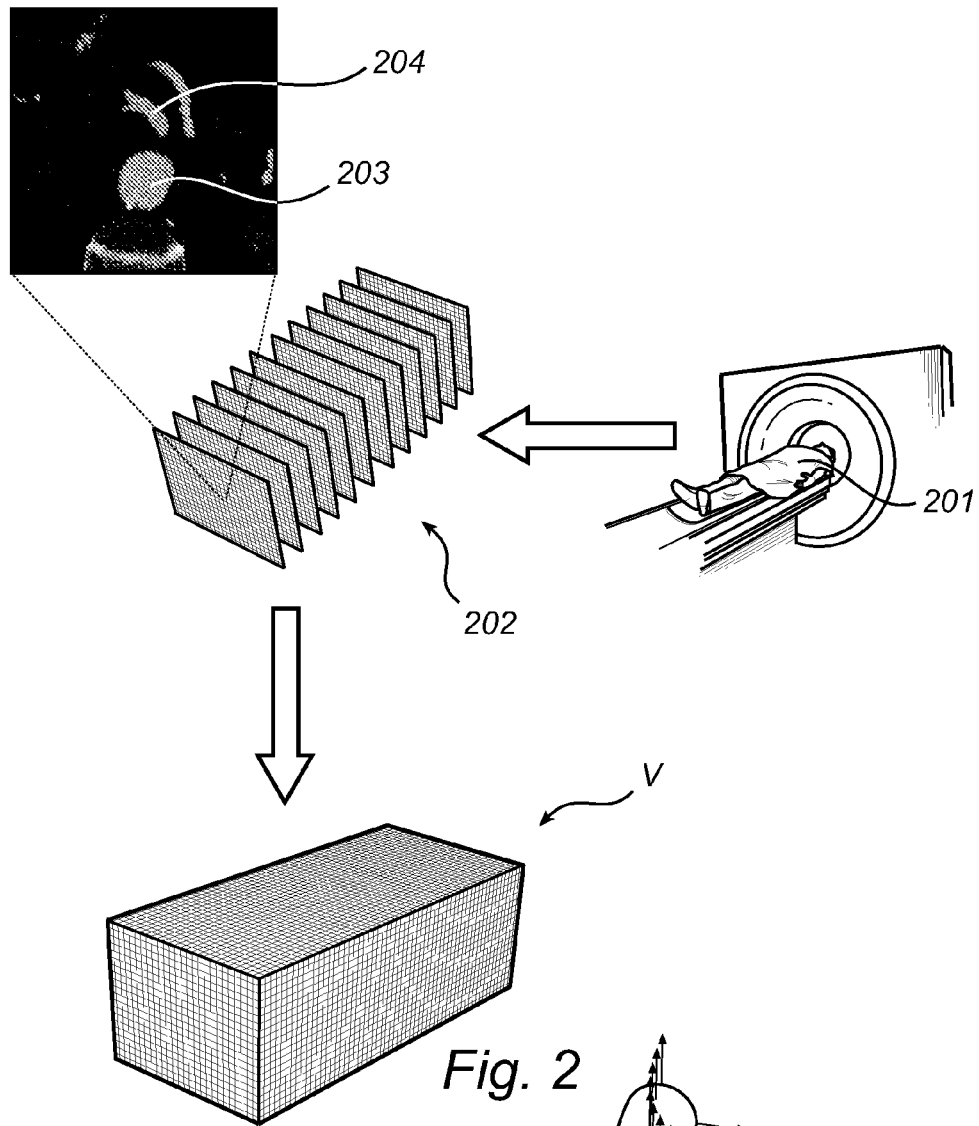
FIG. 2 schematically illustrates volume imaging of a patient.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to those skilled in the art. Like reference characters refer to like elements throughout.

Referring now to the drawings and FIGS. 1a-1c in particular, there is depicted a schematic flow chart illustrating an embodiment of a method for characterizing a blood vessel represented by vascular image data from a DICOM-image. Reference will in parallel be made also to FIGS. 2 and 3.

As indicated by step 101, the vascular system of a patient may be imaged by scanning a patient 201 using e.g. Computed Tomography (CT) or Magnetic Resonance Imaging (MRI). The output is typically a set of DICOM-images 202. Each DICOM-image is a two-dimensional gray scale image representation of the examined area of the patient, which has good contrast for the vascular system relative to other body tissues of the patient. An example of a DICOM-image is depicted in FIG. 2, showing the aorta 203, celiac trunk and left gastric artery 204 of the patient.

The image intensities of each DICOM-image may be adjusted, in step 102, to remove areas of low image intensity that represents hollow portions and regions outside the patient's body. This may be achieved by setting all pixels with a radio density below the radio density for water to a have a value that corresponds to the radio density of water. The radio density of water may vary due to the scale used but is typically 1000 (Hounsfield Units), or 0.

Thereafter, in step 103, three dimensional image data is generated from the set of DICOM-images to provide volume imaging of the patient. The result is a three dimensional array V(x,y,z), where each voxel x,y,z has an associated image intensity. Thus, V(x,y,z) provides a three-dimensional gray scale image representation of the examined area of the patient. To provide a clear and concise notation, each voxel's absolute coordinate (x,y,z) is hereafter denoted as an array p. In step 104, a low pass filter may preferably be supplied to the voxel volume V to suppress noise.

Further, in step 105, a gradient vector of the image intensity in V is determined. The result is an array G indicating the gradient vector for each voxel in the volume V.

$$G(p) = \nabla V(p)$$
$$= \nabla V(x, y, z)$$
$$= \left(\frac{\partial V}{\partial x}, \frac{\partial V}{\partial y}, \frac{\partial V}{\partial z}\right)$$
$$= \hat{x}\frac{\partial V}{\partial x} + \hat{y}\frac{\partial V}{\partial y} + \hat{z}\frac{\partial V}{\partial z}.$$

G can be calculated by convolving V for the x, y, and z-component using a direction operator, such as a Gaussian kernel. The Gaussian kernel may be expressed as:

$$H_g = Ce^{-\frac{x^2+y^2+z^2}{\sigma^2}},$$

where $\sigma$ represents the standard deviation.

Further, the differentiated Gaussian kernel may be expressed as:

$$\nabla H_g = (H_{gx}, H_{gy}, H_{gz}) = \nabla\left(Ce^{-\frac{x^2+y^2+z^2}{\sigma^2}}\right).$$

Thus the gradient vector for each voxel in the volume V can be found by:

$G=(V*H_{gx}, V*H_{gy}, V*H_{gz})$, where * represents a convolution.

Then, in step 106, a set of voxels representing the boundaries of the blood vessels are identified by finding voxels with a gradient vector norm |G| that exceeds a predetermined threshold value. The threshold value depends on the image resolution, and may typically be selected as a constant times the least spatial resolution of the image data.

This yields a binary volume C where $$C(q) = \begin{bmatrix} 0 & \text{when } |G(q)| \leq \text{Threshold} \\ 1 & \text{when } |G(q)| > \text{Threshold} \end{bmatrix}.$$

where q is an array representing a discrete coordinate (i,j,k) of an voxel in volume C. Thus, voxels in C with a value of 1 indicates that a corresponding voxel in V is part of a boundary of a blood vessel.

The boundary may be refined, in step 107, to only include voxels in V for which the second derivative of the image intensity is essentially zero. That is:

$$C(q) = \begin{bmatrix} 0 & \text{when } |G(q)| \leq \text{Threshold or } \nabla^2 V \neq 0 \\ 1 & \text{when } |G(q)| > \text{Threshold and } \nabla^2 V \approx 0 \end{bmatrix}.$$

This provides a more well-defined boundary. However, instead of using a procedure that calculates the second derivative, the refinement of the boundary may be implemented in an iterative procedure as follows. For each voxel in C with a value 1, it is determined whether the corresponding voxel in V has an adjacent voxel in V in a direction of the gradient vector with a larger gradient vector norm. If so, the voxel in C is set to 0. This provides a more robust solution.

The centre and direction of the blood vessels may then be determined as illustrated by step 108 to 112 in FIG. 1b. In step 108, a voxel $q_0$ with a value 1 is selected from the volume C, and in step 109, a gradient vector extension is created, here visualized as a straight line 301, starting at the selected voxel $q_0$ and extending in a direction opposite to the direction gradient vector $G(q_0)$. The gradient vector extension extends until the image intensity falls outside a predetermined range. This range may preferably be selected such that the gradient vector extension stops at the opposite boundary of the blood vessel. The gradient vector extension may also stop at a predetermined maximum length, which may be an estimate of a maximum diameter of a blood vessel.

The starting point $q_0$ of the gradient vector extension 301 is stored in a trace index buffer $M(q)=(M_i(q), M_j(q), M_k(q))$ for each discrete coordinate that the vector extension visits.

In step 110, a new voxel $q_1$ with a value 1 is selected from the volume C, and in step 111, a gradient vector extension 302 is created starting at the selected voxel $q_1$. Further, the starting point $q_1$ of the gradient vector extension is stored in the trace index buffer M(q) for each discrete coordinate that the vector extension visits. If there already is another starting point (e.g. $q_0$) stored in the trace index buffer M(q) this indicates that the gradient vector extension from $q_1$ intersects a gradient vector extension associated with a the previously stored starting point (e.g. $q_0$) and an intersection vector, $v_{isect}$, is calculated as a vector product between these gradient vector extensions in the starting points.

Figure 3:
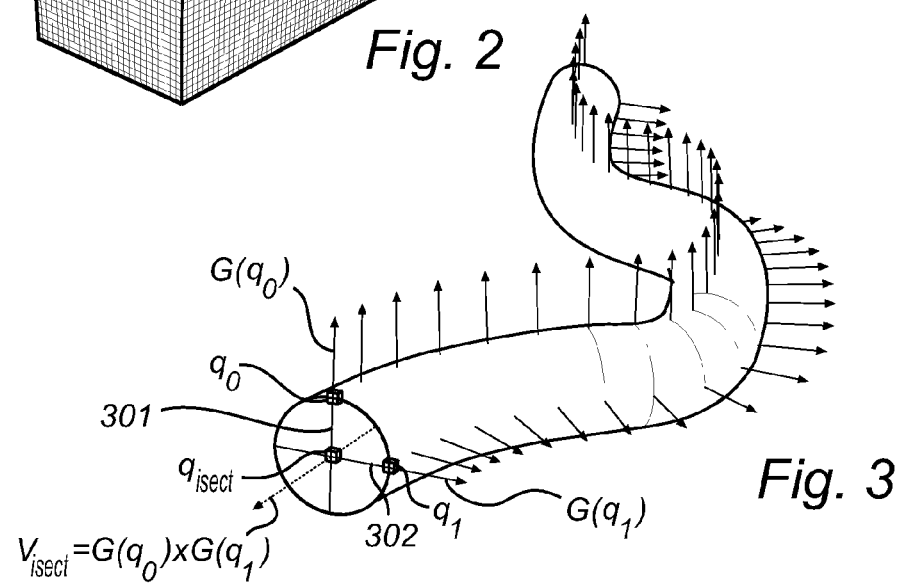
FIG. 3 illustrates the extension of an exemplary blood vessel.

In the example illustrated in FIG. 3, the gradient vector extension 302 from $q_1$ intersects the gradient vector extension 301 from $q_0$, at the discrete coordinate $q_{isect}$, and an intersection vector $v_{isect}$ is calculated as $v_{isect}=G(q_0) \times G(q_1)$ in step 112, where x represents the vector product. This intersection vector, $v_{isect}$, will have a direction perpendicular to both $G(q_0)$ and $G(q_1)$. The intersection vector is now extended from the intersection coordinate $q_{isect}$, both in positive and negative direction. The trace from the extended intersection vector is included in two buffers; one trace visit buffer $F_c(q)$ and one trace direction buffer $F_v(q)=(F_x(q), F_y(q), F_z(q))$. The trace visit buffer will be increased with 1 at each coordinate q that the extended intersection vector visits. The trace direction buffer will be averaged with its previously stored direction (if any) and the intersection vector at each coordinate q that the extended intersection vector visits.

Steps 110 to 112 are repeated for all voxels in C with a value 1.

The blood vessel path may then be determined according to the procedure described below with reference to step 113 to 116 in FIG. 1c.

In step 113, all local maxima in trace visit buffer $F_c$ are found. This may be done by first thresholding the trace visit buffer $F_c$ to a binary volume L, where $$L(q) = \begin{bmatrix} 0 & \text{when } F_c(q) = 0 \\ 1 & \text{when } F_c(q) > 0 \end{bmatrix}.$$

For each voxel in L with a value 1, it is determined whether the corresponding voxel in $F_c$ has a neighbouring voxel in $F_c$ which has a larger value. If so, the voxel in L is set to 0. Hence, a voxel in L that still has a value 1, indicates that the corresponding voxel in $F_c$ has a higher value than its neighbours in $F_c$, i.e. it is a local maxima in $F_c$.

In step 114, the local maxima in $F_c$ are sorted in falling order, i.e. the local maxima with the most extended intersection vector visits is first. As large blood vessels typically have large local maxima this allows to start the vessel paths at the largest vessels.

In step 115, start at a local maxima in $F_c$ denoted $r_0$ where $r_0$ is an array representing a voxel $(l_0, m_0, n_0)$.

Further, taking a step in the positive axial direction is indicated by $F_v(r_0)=(F_x(r_0) F_y(r_0) F_z(r_0))$. The new coordinate is $(a_1, b_1, c_1)$. In step 116, the closest maxima that is located in a plane that is orthogonal to $F_v(r_0)$ and extends through coordinate $(a_1, b_1, c_1)$ is determined. This may be implemented by iteratively comparing the gradient vector norm of the current voxel with the gradient vector norm of all neighbouring voxels located in the plane and changing to the neighbouring voxel in the plane that has the largest gradient vector norm until a voxel is found having a gradient vector norm larger than all neighbouring voxels in the plane. The coordinate where the closest local maxima is, is denoted $r_1$.

Next, taking a step in positive axial direction is indicated by $F_v(r_1)$ and the procedure in step 115 and 116 are repeated until an end condition is fulfilled.

Then, start from coordinate $r_0$ and trace the blood vessel in the negative axial direction $-F_v(r_0)$ until an end condition is fulfilled.

Typical end conditions may, as indicated above, be at least one of that a boundary of the voxel volume is reached, that a blood vessel path that has already been traced is reached, that the intensity is below a predetermined threshold value and that the vector indicating the axial direction of the blood vessel $F_v(r)$ is a null vector.

Figure 4:
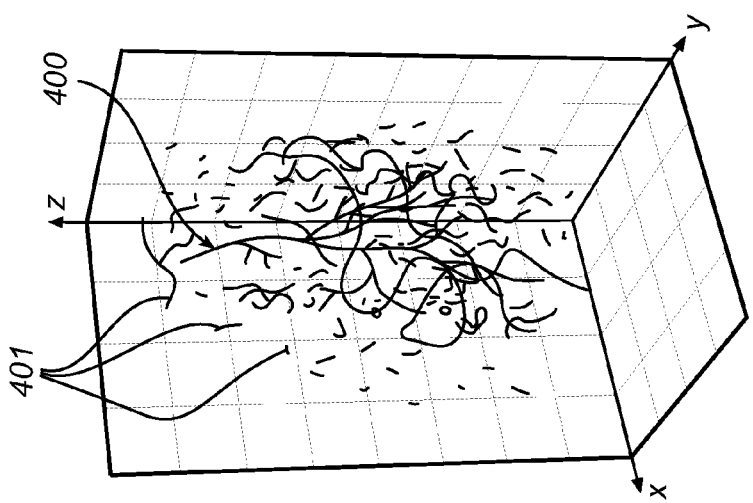
FIG. 4 illustrates an example of a plurality of paths.

FIG. 4 schematically illustrates a set of paths 400,401 traced out by the above described procedure. The paths constitute the centre axis for all tube-shaped structures in a network, such as a blood vessel system.

According to an embodiment a list of how the blood vessel paths relate to each other is generated. This list can be created as the blood vessel path is traced out and includes information whether a vessel ends at the boundary of the voxel volume, in empty nothingness, or on an earlier created vessel path. Thus, for each created vessel path, there is information about how it relates to the other vessel paths. The list is examined and blood vessel paths that do not fulfil a set of predetermined criteria are removed. For example, blood vessels which are not attached to the rest of the blood vessel system are removed.

Figure 5:
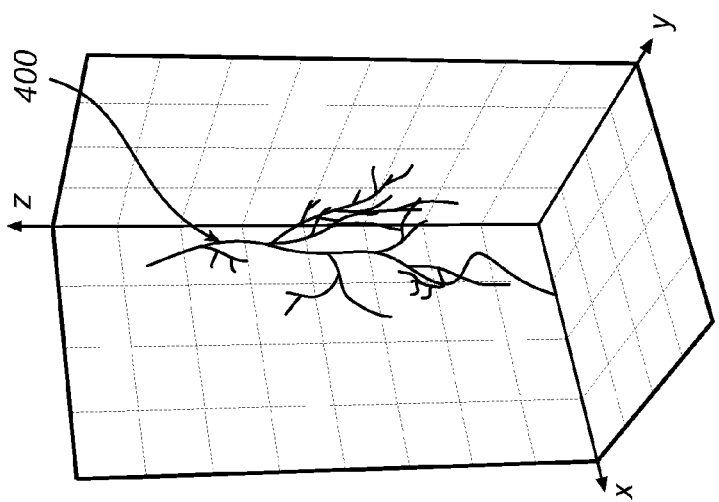
FIG. 5 illustrates an example of paths of a blood vessel system.

FIG. 5 schematically illustrates the paths 400 of the blood vessel system after the paths 401 which are not attached to the rest of the blood vessel system have been removed as is discussed above.

Figure 6:
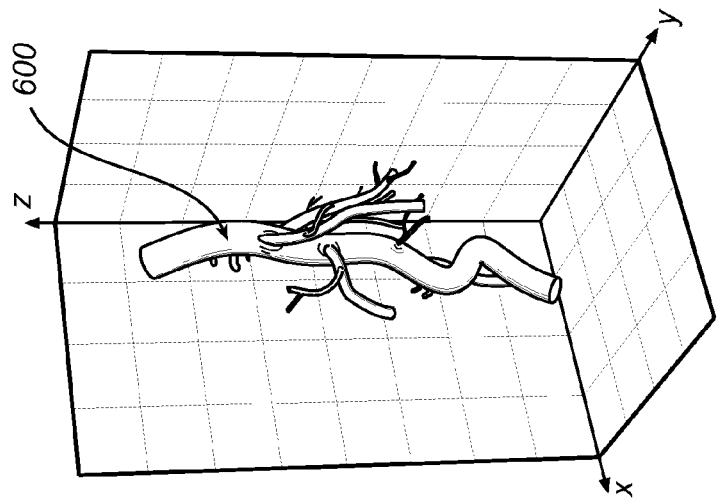
FIG. 6 illustrates an example of a blood vessel system after a vessel surface has been generated around the paths.

Starting from the blood vessel path, a blood vessel surface can be created by sampling in a plane normal to a direction of the path. The sampling may be performed by known imaging techniques. For example, one may use a two dimensional deformable object starting from a point and growing radially with "forces" determined by the intensity-, gradient- and curvature-information. The resulting blood vessel system 600 is schematically illustrated in FIG. 6.

The person skilled in the art realizes that the present invention is not limited to the preferred embodiments. For example, the principles of the invention are equally applicable for a situation where the image intensity is higher in the blood vessel than in the surrounding tissue. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims. Also, the disclosed method steps may be executed in any different order.

I claim:

1. A method for characterizing a blood vessel represented by vascular image data from a DICOM-image, wherein said vascular image data comprises a plurality of voxels each having an image intensity, said method comprising:

identifying a set of voxels representing at least a portion of a boundary of the blood vessel;

determining a gradient vector of the image intensity for each voxel in said set of voxels representing the boundary of the blood vessel;

selecting, from said set of voxels representing the boundary of the blood vessel, a subset of voxels such that all voxels in said subset of voxels have a common intersection point for their respective gradient vector extensions; and determining a vector product based on said gradient vectors for said subset of voxels, wherein the common intersection point indicates a center of said blood vessel and said vector product indicates a direction in which said blood vessel extends, and the method further comprising:

iteratively selecting an additional subset of voxels from said set of voxels representing the boundary of the blood vessel, wherein all voxels in said additional subset of voxels have a common intersection point for their respective gradient vector extensions and the common intersection point indicates a possible center point of said blood vessel;

finding a plurality of possible center points of said blood vessel;

selecting a voxel that corresponds to one of the center points as a starting point for the blood vessel; and tracing the blood vessel path by iteratively:
identifying a possible center point that is located in a plane that is orthogonal to the direction of the blood vessel wherein said plane extends through a voxel that is located within a predetermined range from the current center point in a direction of the blood vessel; and
including the identified possible center point in the blood vessel path.

2. The method according to claim 1, wherein said step of identifying a set of voxels representing a boundary of the blood vessel further comprises:
computing a gradient vector of the image intensity for each of said plurality of voxels; and
selecting a set of voxels having a gradient vector norm exceeding a predetermined threshold value.

3. The method according to claim 1, wherein the gradient vector extension is adapted to extend in a direction opposite to the direction of the gradient vector.

4. The method according to claim 1, wherein a length of the gradient vector extension is determined by a predetermined end condition.

5. The method according to claim 1, further comprising:
selecting, when there is more than one possible center point located in said plane, the center point that has the most intersecting gradient vector extensions.

6. The method according to claim 1, wherein the step of tracing the blood vessel path terminates when an end condition is fulfilled, wherein said end condition is selected from a group consisting of:
a boundary of the voxel volume is reached;
a blood vessel path that has already been traced is reached;
the intensity of the center point is below a predetermined threshold value;
the vector product associated with the center point is a zero vector.

7. A method for creating a blood vessel system by:
determining a plurality of blood vessel paths according to claim 1;
removing un-attached blood vessel paths from the blood vessel system.

8. The method according to claim 1, further comprising creating a blood vessel surface by sampling in a plane normal to a direction of said path.

* * * * *